L. ARNOLD.
Corn-Planter.
No. 16,636.
2 Sheets—Sheet 1.
Patented Feb. 17, 1857.
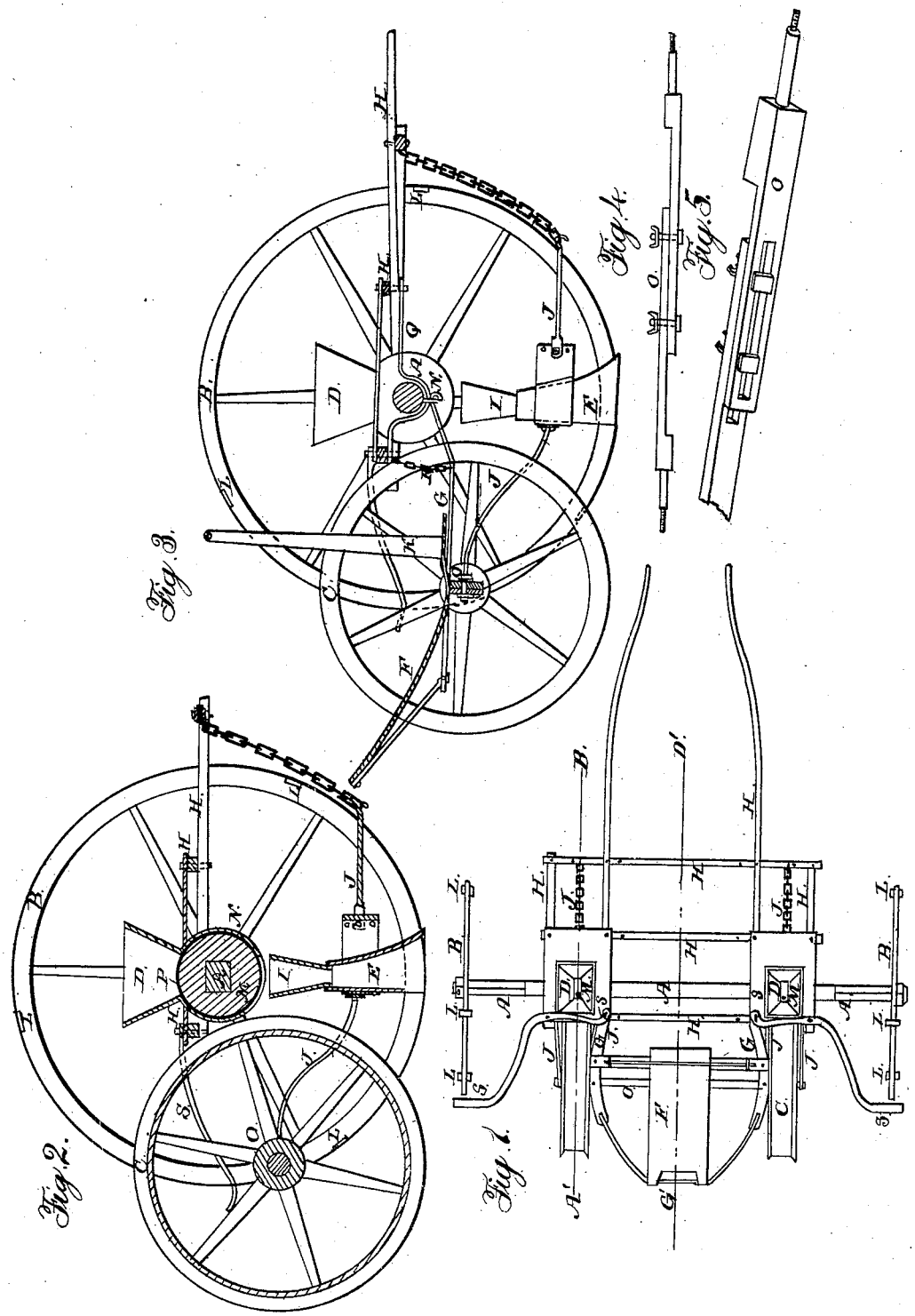

2 Sheets—Sheet 2.
L. ARNOLD.
Corn-Planter.
No. 16,636.
Patented Feb. 17, 1857.
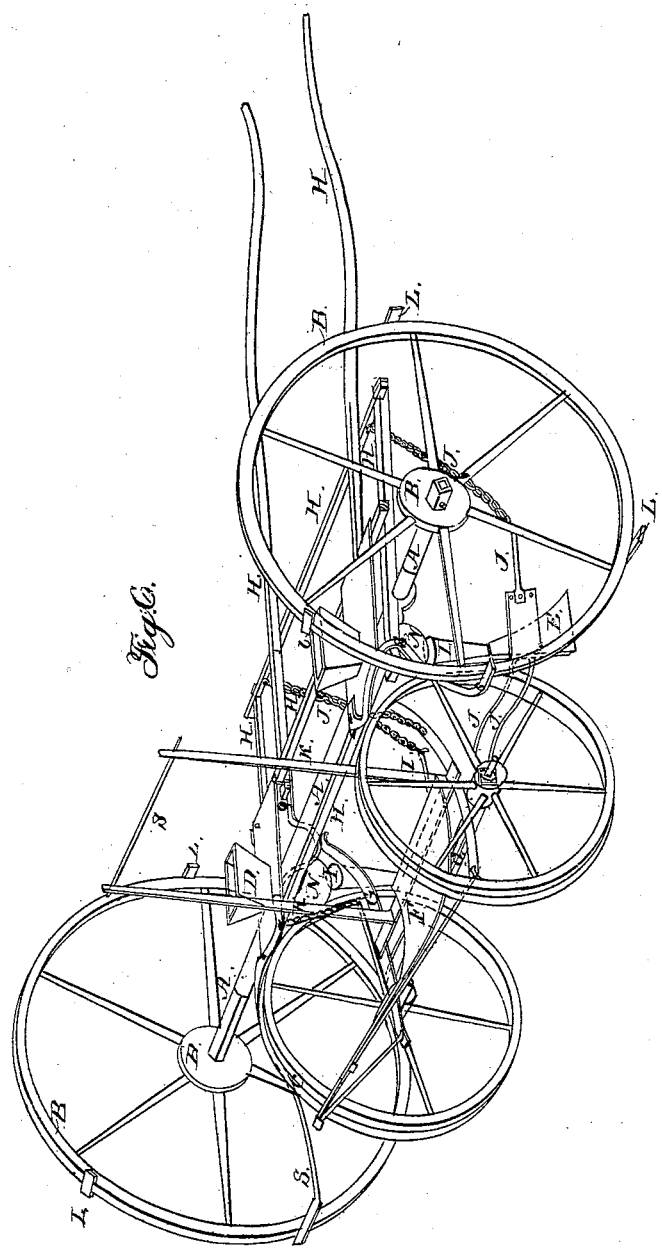

UNITED STATES PATENT OFFICE.

LEONARD ARNOLD, OF JANESVILLE, WISCONSIN.

IMPROVEMENT IN SEED-PLANTERS.

Specification forming part of Letters Patent No. 16,636, dated February 17, 1857.

*To all whom it may concern:*

Be it known that I, LEONARD ARNOLD, of the city of Janesville, Rock county, and State of Wisconsin, have invented a new and useful Improvement in Seed-Planters, to plant either in hills or in drills; and I do hereby declare the following to be a full, clear, and exact description thereof, reference being had to the annexed or accompanying drawings, making part of this specification.

The nature of my invention consists in employing two frames in constructing the machine, the forward frame resting on the axle of the principal or driving wheels, and the rear frame resting on the axle of the covering-wheels and extending forward and under the forward frame, to which it is jointed, and acting as a lever in elevating the forward frame, driving-wheels, and plows clear from the ground in turning round and in passing from point to point, as and for the purpose presently described.

To enable others skilled in the art to make and use my invention, I will proceed to describe the same, the same letter representing the same part of the machine in each figure in the accompanying drawings.

Figure 1 is a plan. Figs. 2 and 3 are vertical sections. Figs. 4 and 5 are detail drawings, and Fig. 6 is a perspective drawing of the machine when put together and ready for use.

A is the straight axle, to which is firmly attached the principal or driving wheels B and the cylinders or drums M at the bottom of the hoppers D, and on which rest the frame and thills H. The axle, wheels, and cylinders revolve together. The distance from each wheel to the nearest cylinder is one-half of the distance from one cylinder to the other, thus forming, in connection with the marking-blocks L, a perfect guide in marking the ground and planting the rows straight and at right angles. For example, cross the side of a field so that the right wheel makes a track on the plowed or mellow ground. In recrossing the field the right-hand wheel is made to follow the track it made in first crossing, care being had to have the marking-blocks fit the prints made in first crossing. The second time, in crossing, the left-hand wheel makes a track farther in the field, which track must be followed in again crossing, care being had, as before, to have the marking-blocks fit the prints they made when first making the track, the seed being dropped from the cylinders at the same moment the blocks strike the ground. The seed passes through the shanks of the plows into the furrows made by the plows, and is covered by the broad-flanged covering-wheels C, which pass immediately after the plows.

E, in Figs. 2 and 3, represent the plows; also, J represents the rods, bars, or chains that connect the frame H with the plows E, and thence to the axle O of the covering-wheels. This arrangement of moving the plows is so that that they may accommodate themselves to uneven surfaces when the machine is in operation.

O is an axle, on the arms of which the wheels C revolve similar to the wheels of an ordinary wagon, and on this axle is the frame-work G. This axle is made in two parts, and is lapped so as to be lengthened or shortened, according to the width of the rows, while the hubs of the driving-wheels are fitted to the square arms of the straight revolving axle, so as to be moved longitudinally on the axle according to the width desired for the rows, the forward frame-work, hoppers, and cylinders being movable for the same purpose.

F, in Fig. 3, is a platform, the frame of which rests on the axle O as a fulcrum, the longitudinal bars G G of which extend to a point under the strong circular bars Q Q, that pass under the axle A of the principal wheels, and to which circular bars they are jointed directly under the axle. By standing on the platform back of the axle O the frame-work of the platform acts as a lever and raises the principal wheels, axle, and plows from the ground far enough to turn around and go from point to point without operating the machine for planting purposes, as the large wheels, being raised from the ground, do not revolve, and, when the right point for planting is reached, by throwing the weight forward on the platform, the large or driving wheels and plows are brought to the ground, and the machine is ready to work by being moved forward.

R R, in Fig. 3, are bolts or chains that pass vertically through the frame-work H, thence downward, and pass loosely through the bars of the frame-work G, and extending below the frame-work G a few inches, where they are provided with screws, the heads of these bolts or chains resting on the upper side of the frame-work H.

In operating the platform-lever the principal wheels are raised until the space between the two frames is extended as far as the length of the bolts or chains R will allow, and thus the principal wheels are kept firmly at a given distance from the ground while moving the machine from point to point. The distance the wheels are elevated depends on the length of the bolts or chains R, and by means of a screw on the bolts the distance may be regulated at pleasure.

Instead of bolts and chains, other equivalents of suitable length may be used by being fastened to or passing through the respective frames.

K K are posts extending upward from the platform F, with the bar S, in Fig. 6, between them, to afford support for the driver in managing the machine.

What I claim as my invention, and desire to secure by Letters Patent, is—

Employing two frames in constructing the machine, the forward frame resting on the axle of the principal or driving wheels, and the rear frame resting on the axle of the covering-wheels and extending forward and under the forward frame, to which it is jointed, and acting as a lever in elevating the forward frame, driving-wheels, and plows clear from the ground in turning round and in passing from point to point, substantially as and for the purposes set forth.

LEONARD ARNOLD.

Witnesses:
  J. M. MAY,
  A. HOPKINS.